United States Patent [19]
Lauener

[11] Patent Number: 5,895,867
[45] Date of Patent: Apr. 20, 1999

[54] DEVICE FOR MEASURING TORQUE

[76] Inventor: Martin Lauener, Seebergstrasse 72, 4558 Winistorf, Switzerland

[21] Appl. No.: 08/931,826

[22] Filed: Sep. 16, 1997

[30]     Foreign Application Priority Data

Sep. 19, 1996 [EP] European Pat. Off. ............ 96810620

[51] Int. Cl.$^6$ ...................................................... G01L 5/25
[52] U.S. Cl. ..................................... 73/862.29; 73/862.28
[58] Field of Search ........................... 73/862.28, 862.29

[56]            References Cited

U.S. PATENT DOCUMENTS

| | | |
|---|---|---|
| 2,845,795 | 8/1958 | Emmerling . |
| 3,595,074 | 7/1971 | Johnson . |
| 3,742,758 | 7/1973 | Pohl ................................. 73/862.29 |
| 4,152,930 | 5/1979 | Fujimoto et al. .................. 73/862.29 |
| 4,613,800 | 9/1986 | Jeppsson ........................... 73/862.29 |

FOREIGN PATENT DOCUMENTS 40 29 361 C1   9/1991   Germany .

OTHER PUBLICATIONS

Awano Seiichi Dynamometer with built–in planetary type accelerator ordecelerator Apr. 1983 p. 246.

*Primary Examiner*—Ronald Biegel
*Attorney, Agent, or Firm*—Pearne, Gordon, McCoy & Granger LLP

[57]         ABSTRACT

A device for measuring the torque, released or received through a shaft, of machinery or apparatus, in particular an engine or a machine, comprises a first holding part, which is essentially firmly connected to a base. This first holding part is equipped with bearing means in which a second holding part is mounted so that it is pivotable about a pivot axis. The machinery or apparatus is disposed on the second holding part. The bearing means are designed in such a way that the pivot axis, about which the second holding part is pivotable with respect to the first holding part, is substantially coaxial to the axis, about which the shaft of the machinery or apparatus is rotatable. Inserted between the first holding means and the second holding means is a carrying part which is equipped with measuring means and which limits the pivoting. The force, or respectively the torque, acting upon the carrying part can be measured with the measuring elements. With this arrangement the torque can be detected, interference from additional forces acting upon the shaft of the machinery or apparatus being excluded.

19 Claims, 3 Drawing Sheets

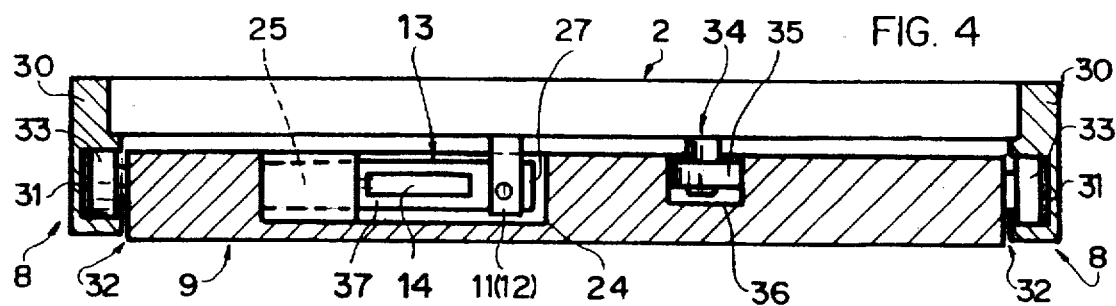
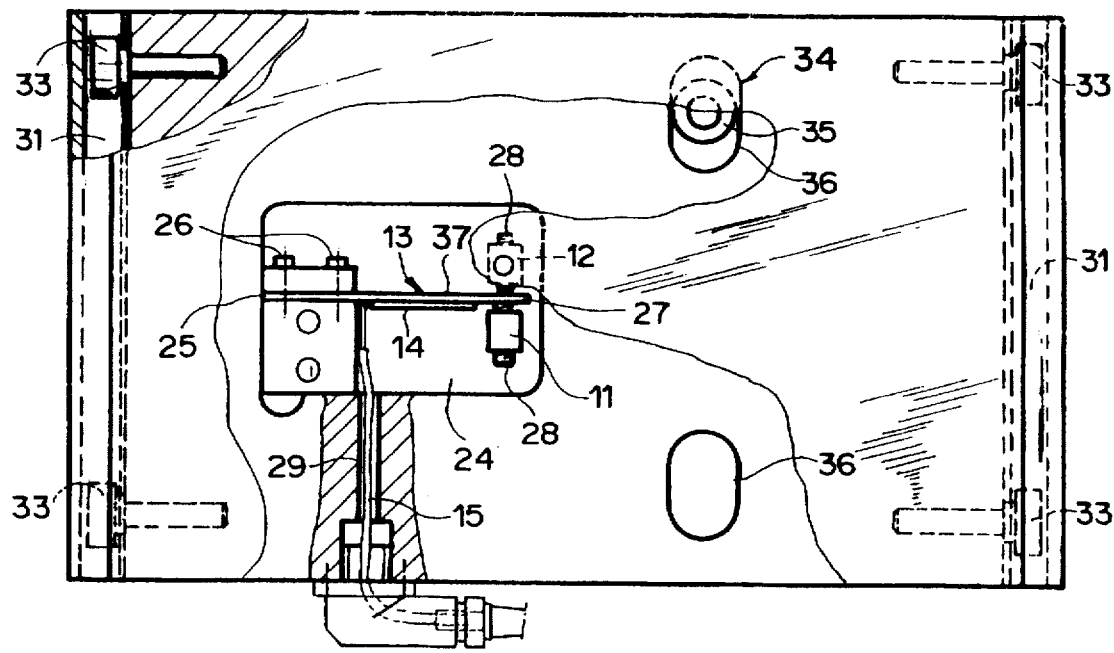
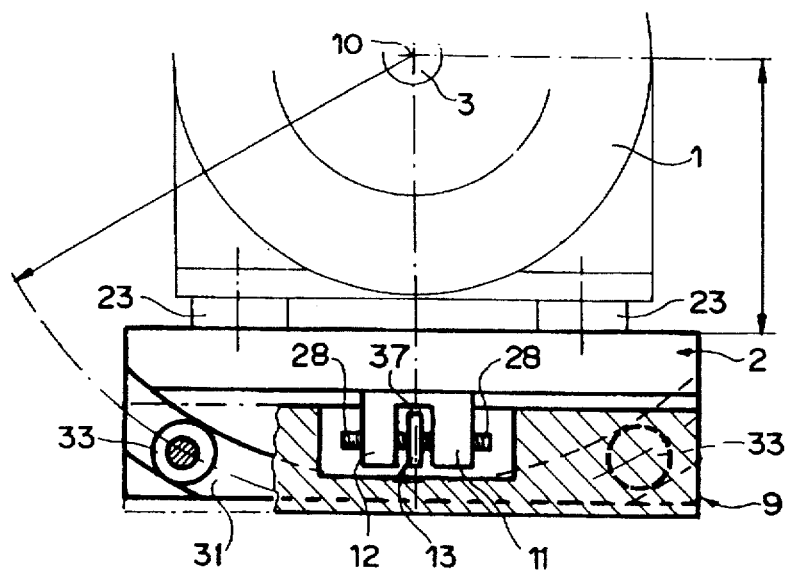

DEVICE FOR MEASURING TORQUE

This invention relates a device for measuring torque input or output through a shaft of machinery or apparatus, in particular an engine or a machine, which is disposed on a fixed base and is secured against movement by means of holding means.

The torque imparted through a shaft is a direct indication of the transferable forces, and when the angular velocity of the shaft is known, the power transmitted is known. By measuring this torque and the angular velocity, for example in the case of electromotors and geared motors, the mechanical power delivered can be determined, precisely and continuously, independently of the electrical efficiency, phase shift and losses due to friction.

A known possible way to measure the torque consists, for example, in inserting a torque rod in the shaft through which the torque is imparted. This torque rod is provided with suitably placed resistance strain gages, whose output voltage differences, evaluated and amplified in a bridge circuit, give a proportional value for the strain and thus reveal the torque. The resistance strain gages provide only very weak signals, which must be conveyed to an evaluation device. This transmission takes place, for example, through slip rings or by radio means, it being possible to amplify the signals already by means of appropriate electronics co-rotating on the shaft. The transmitted signals are then evaluated in a suitable device. The signal transmission via slip rings or radio requires costly means, it not being possible to fully exclude interference.

A further known device for measuring torque, whereby transmission of signals from a rotating shaft to a stationary device is avoided, comprises again a torque rod on which two toothed rings are provided, spaced at a certain distance from each other. These two toothed rings each cooperate with a concentrically disposed stator, which is equipped with sensors, and can register, by induction, impulses of the teeth moving past. When the torque rod turns because of the torque to be imparted, the impulses of the one ring with respect to those of the other ring undergo a phase shift proportional to the strain of the rod. This phase shift can be evaluated as a measurement for the torque. Since the torque rod cannot be as long as desired, and since it has to be constructed to be appropriately rigid, the phase shift to be measured is very small. Consequently very high demands are placed on the measuring electronics, and therefore these electronics are necessarily of costly design. A further drawback of this device is the fact that the torque cannot be measured while the shaft is at a standstill.

It is thus the object of this invention to propose a device designed in such a way that measurement of the torque imparted through a shaft can be carried out simply and at minimal cost, the aforementioned drawbacks being avoided.

This object is achieved according to the invention in that the holding means comprise at least one first holding part, which is essentially firmly connected to the base and which is equipped with bearing means in which at least a second holding part is mounted, on which the machinery or apparatus is disposed, the bearing means being designed in such a way that the at least one second holding part is pivotable with respect to the at least one first holding part about a pivot axis, which is substantially coaxial to the axis about which the shaft is rotatable, and inserted between the at least one first holding part and the at least one second holding part is a carrying part which is equipped with measuring elements and which limits the pivoting.

With this device it is not the torque having an effect upon the shaft which is measured directly, but rather the equally great reaction torque having an effect opposite to said torque, the reaction torque having an effect, through the corresponding machine parts, on a spatially stationary base. The measuring elements can thus be likewise accommodated in this fixed base, the transmission of signals being thus problem-free.

In that the second holding part, upon which the machinery or apparatus with the shaft is disposed, is pivotable about a pivot axis, which is substantially coaxial to the axis about which the shaft is rotatable, other external forces having an effect on the shaft, such as, for example, belt drive forces or chain drive forces or the like, do not interfere with the measured reaction torque. Therefore no further steps have to be taken in the measuring device to ensure that any influence from such additional forces is left disregarded. This simplifies the construction of the measuring device.

Advantageous is that with the device according to the invention the torque input or output via the shaft can also be measured when the shaft is at a standstill.

The two holding parts are each preferably designed essentially plate-shaped and are disposed one over the other. Therefore these two holding parts can be built into a corresponding installation simply. It is also possible to retrofit an already existing installation accordingly since this device can be inserted without any problems between the machine part and, for example, the base.

So that the pivot axis can be brought into a coaxial position with respect to the axis about which the shaft rotates, interim elements are preferably inserted between the machinery or apparatus and the second holding part. Moreover, these interim elements can, for example, be adjustable in height in a known way. Thus it is not necessary to construct a special device for each application, but instead the devices can have certain dimensional graduations.

A preferred embodiment of the invention consists in that the bearing means for bearing the second holding part with respect to the first holding part are each provided in the end areas of these two holding parts. This device therefore has the shape of a plate, which can easily be inserted between the machinery or apparatus and the base, for example. Completely avoided in this way is any spatial impeding of machine elements to be coupled to the shaft of the machinery or apparatus. The bearing means can have a guide in the form of a guideway, provided on one of the two holding parts, into which counterparts are led, which are fastened to the other of the two holding parts. The guideway is hereby shaped preferably such that a pivoting about an instantaneous pivot axis results, which is at least close to coaxial to the axis about which the shaft rotates.

To achieve a simple construction of the bearing means, two supporting levers in each case can be used instead of a guideway. Their one end is coupled to the end area of the first holding part and their other end is coupled to the end area of the second holding part. The coupling points of each supporting lever each lie in a straight line running, in the unpivoted state of the holding parts, essentially through the axis about which the shaft is rotatable. In particular, with this design of the guide, in the case of very minimal pivoting movements of the one holding part with respect to the other holding part, the instantaneous pivot axis does not move excessively away from the axis, about which the shaft is rotatable, the interference from other external forces on the measured values remaining small enough to be negligible.

To obtain as precise a measuring result as possible, and to prevent the bearing arrangement from having to absorb other forces besides those directed radially to the shaft, further guide means are provided, which absorb the lateral forces which take effect essentially in the longitudinal direction with respect to the axis.

A further preferred embodiment of the invention consists in the carrying part being an elastically deformable element, in the form of a bending beam. This beam is fastened by its one end to one of the two holding parts in a way so that it can be detached and exchanged; its other end projects between two stops, which are fixed to the other of the two holding parts. By means of this arrangement, a bending beam can be used having a flexural strength suited to the expected torque. Thus, using the same device with different bending beams, torques of different intensities can be measured in an optimal way.

The carrying part can also have a housing in which the measuring elements in the form a piezoelectric crystal are accommodated. There is known to be little deformation with this, whereby the advantage is attained that the mutual pivoting of the holding parts is likewise very minimal.

Of course other measuring elements could be used which permit measurement of a force or of torque, for example those based on inductive measuring technology.

Further preferred embodiments of the invention follow from the further dependent claims.

Embodiments of the device according to the invention will be explained more closely in the following, by way of example, with reference to the attached drawing in which:

FIG. 4 is a sectional view of a second embodiment of the bearing means between first and second holding parts;

FIG. 5 is a top plan view of the device according to FIG. 4, partially in section;

FIG. 6 is a view from the front of the embodiment according to FIGS. 4 and 5, shown partially in section;

Figure 1:
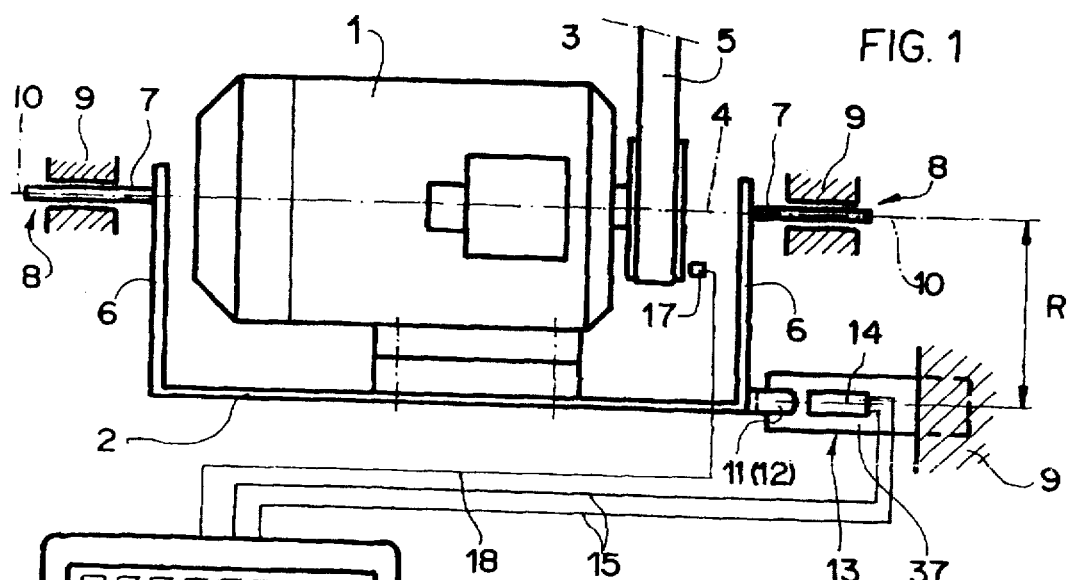
FIG. 1 shows schematically the main construction of a device according to the invention.

In the first embodiment of the device according to the invention, shown systematically in FIG. 1, the machinery or apparatus 1, shown in this figure as an electromotor, is mounted on a second holding part 2. The machinery or apparatus 1 has a shaft 3, which is rotatable about the axis 4. The shaft 3 is driven. Some further unit, not shown, can be driven by means of a belt 5.

The second holding part 2, which is designed essentially plate-shaped, is provided on both sides with a carrier 6 at each end. Fixed to each carrier end 6 is a journal 7 which is disposed in bearing means 8 of a first holding part 9, shown only schematically here. Thus by means of the journal 7, the second holding part 2 is disposed pivotable about a pivot axis 10, the pivot axis 10 being aligned coaxial to the axis 4.

The torque acting on the shaft 3 results in a reaction torque being exerted on the second holding part 2. The magnitude of said reaction torque corresponds to that of the torque acting on the shaft 3, but has an opposite rotational direction. The second holding part 2 is prevented from rotating about the pivot axis 10, as will be described further on.

The tensile forces arising, for example through the belt 5, are absorbed in the bearing means 8, and since axis 4 and pivot axis 10 are coaxial, these forces have no effect on the reaction torque.

Figure 2:
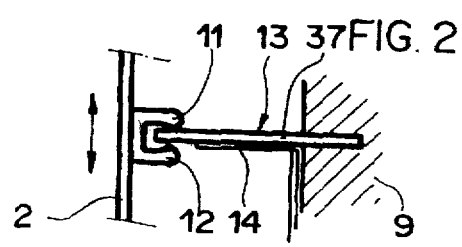
FIG. 2 shows the carrying part, which takes the form of a bending beam, provided with measuring elements.

Fixed to the second holding part 2 are two stops 11 and 12, between which a carrying part 13 projects, as is particularly visible also in FIG. 2. This carrying part 13 is designed as the bending beam 37. This bending beam 37 is fixed on the first holding part 9.

Through the reaction torque, which has an effect on the second holding part 2, this bending beam 37 is subjected to bending by way of stops 11 and 12. Fastened to this bending beam 37 are measuring elements in the form of resistance strain gages 14. These resistance strain gages 14 are connected to a control device 16 via connection lines 15.

The bending of the bending beam 37 can be determined in a known way by means of these resistance strain gages, which gives information about the force acting thereupon, with which information, taking into consideration the spacing R of the bending beam 37 from the pivot axis 10, the torque can be calculated in the control device 16 in a known way and displayed.

With further measuring means in the form of a sensor 17, the angular velocity of the shaft 3 can be measured, said sensor 17 likewise being connected to the control device 16 via connection lines 43. In this way, by means of the correspondingly equipped control device 16, the power can be determined, which can then also be displayed.

Figure 3:
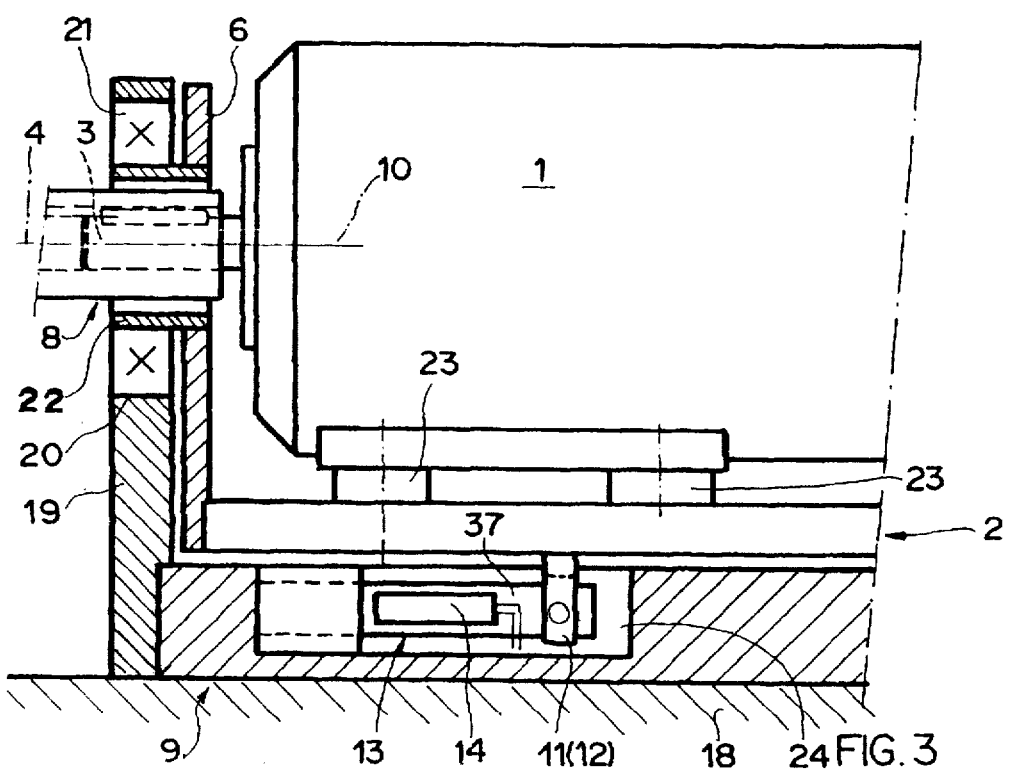
FIG. 3 shows a first embodiment of the bearing means between first and second holding parts and of the arrangement of the measuring elements, partially in section.

FIG. 3 shows the construction of one of the bearing means 8 according to the system shown in FIG. 1. The first holding part 9 is firmly connected to a base 18. The first holding part has a supporting part 19 which projects into the areas of the shaft 3 of the machinery or apparatus 1. The supporting part 19 is provided with a passage 20 through which the shaft 3 is led. A bearing 21 is inserted into the passage 20. Pivotably disposed in this bearing 21 is a sleeve 22, which is fixed to the carrier 6 of the second holding part 2.

The machinery or apparatus 1 is fixed to the second holding part 2, it being possible to insert interim elements 23 between it and the holding part 2. The varying thicknesses of these interim elements can be used in a known way, so that the machinery or apparatus 1 can be adjusted in such a way that the axis 4, about which the shaft 3 is rotatable, is coaxial with the pivot axis 10, about which the carrier 6 is pivotable about the bearing means 8.

Provided in the first holding part 9 is a recess 24 in which the bending beam 37 with the resistance strain gages 14 disposed thereon is accommodated. This bending beam 37 is fixed on the first holding part 9, and, as already described with respect to FIGS. 1 and 2, projects between two stops 11 and 12, which are mounted on the second holding part 2.

Figure 7:
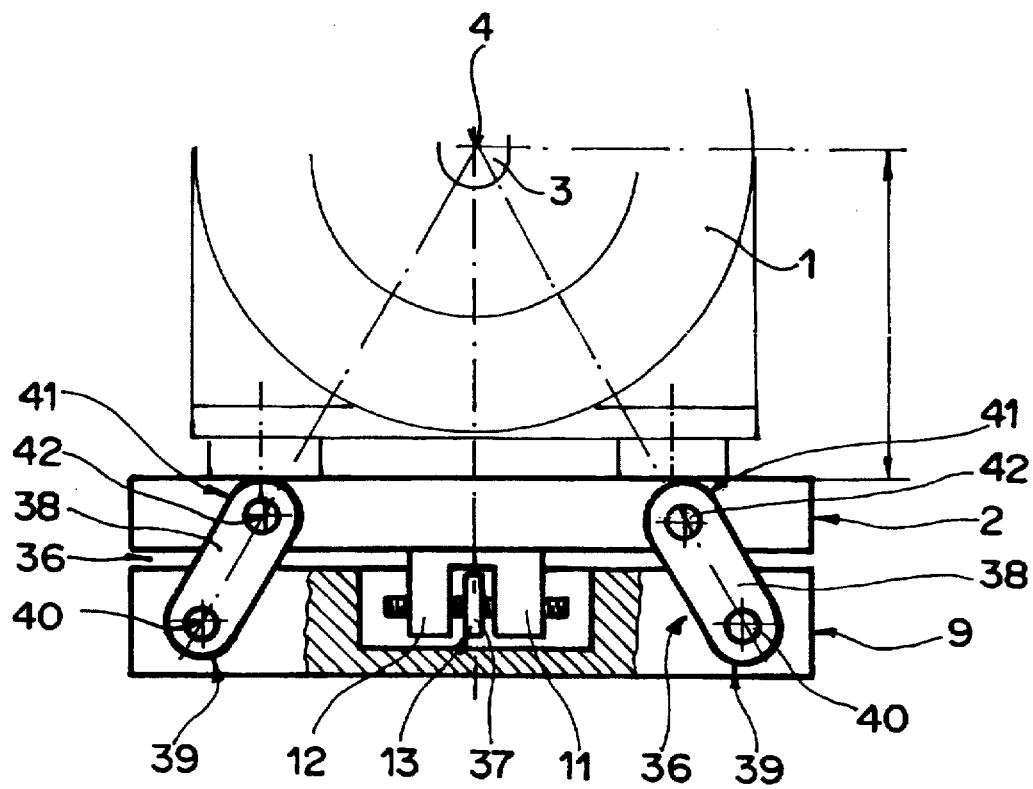
FIG. 7 shows a further embodiment of the bearing means between first and second holding parts.
Figure 8:
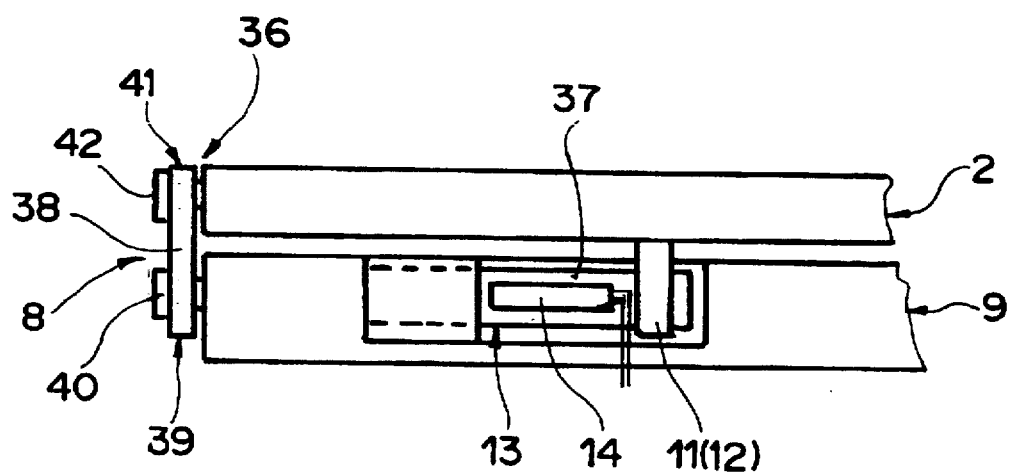
FIG. 8 is a view from the front of the embodiment according to FIG. 7, shown partially in section.

The design in this area is identical for the embodiments of the inventive device shown in FIGS. 4 to 6 and in FIGS. 7 and 8. Again the recess 24 is provided in the first holding part 9. The bending beam 37 is fixed by one end 25 to the first holding part 9 by means of detachable screws 26. The other end 27 of the bending beam 37 projects between the two stops 11 and 12, which are mounted on the second holding part 2. Screwed into the two stops 11 and 12 are set screws 28, by means of which the stop point with respect to the bending beam 37 can be adjusted.

The connection lines 15 can be led through a bore out of the recess 24 out of the first holding part 9.

The bearing means 8 of this embodiment are composed of a profile bar 30 which is fastened to both ends of second holding part 2 by means of screws (not shown). In this profile bar 30 a slot-shaped guideway 31 is made which is situated opposite the ends 32 of first holding part 9. Guided in the guideway 31 are rollers 33 which are pivotably mounted on the first holding part 9.

As can be seen from FIG. 6, the guideway 31 is designed as a circle whose center is situated on the pivot axis 10. Thus, also in this embodiment, the second holding part 2 can pivot with respect to the first holding part 9 about the pivot axis 10, measurement of the torque taking place in an identical way as has been described previously.

It would also be conceivable, moreover, that the shape of the guideway 31 shown in FIG. 6 is not circular, but is made up of two straight lines put together which run tangential. This could find application in the case of very small pivot movements of the second holding part 2 with respect to the first holding part 9, since deviations from the circular path would thereby be minimal.

Through the preferably only tiny pivot movements of the second holding part 2 with respect to the first holding part 1, the dimensions in length of the guideways 31 in the pivot direction could be kept very small, which could result in simpler manufacture and thus lower costs.

If the rollers 33 have to absorb only radially directed forces, there is greater precision in torque measurement. To achieve this, further guide means 34 are provided between the first holding part 9 and the second holding part 2. These further guide means consist of two rollers 35 pivotably fixed on second holding part 2, which engage in correspondingly provided guideways 36 in the first holding part 9. These guideways 36 run essentially in pivot direction. Through these further guide means 34 forces can be absorbed which have an effect essentially longitudinally in the direction of the shaft 3 of the machinery or apparatus 1.

Of course the guide means 34 could be of different, known design from that indicated with respect to this embodiment.

It is also conceivable with this embodiment to provide two rollers 33 on one side of the second holding part 9, with only one roller 33 being necessary on the other side, if the described further guide means 34 are present. The further guide means 34 could also be omitted if the rollers 33 and the guideways 31 are constructed in such a way that pushing forces can also be absorbed.

This second embodiment of the invention, which is shown in FIGS. 4 to 6, has the advantage over the first embodiment that the area of the shaft 3 of the machinery or apparatus 1 remains completely free.

It would also be conceivable to provide a bearing arrangement on one side of the device, as has been described with respect to FIGS. I to 3, while on the other side of the device the bearing arrangement could be designed such as has been shown in FIGS. 4 to 6.

As has already been mentioned, the bending beam 37 is exchangeable, making it possible for bending beams of differing degrees of flexibility to be used, depending upon the anticipated magnitude of the torque.

A further example embodiment of the bearing means 8 is shown in FIGS. 7 and 8. The guide 36 here comprises two support levers 38. One end 39 of each of said support levers 38 is connected to first holding part 9 by means of a bolt 40 inserted into first holding part 9, while the other end 41 is connected to second holding part 2 by means of a further bolt 42 inserted into second holding part 2. In a middle, unpivoted state of the second holding part 2 with respect to the first holding part 9, the two support levers 38 are aligned in such a way that the connection points formed by the axes of bolts 40 and 42 of each support lever 38 lie on a straight line that runs through the axis 4 about which the shaft 3 is rotatable. In the case of very minimal pivoting of the second holding part 2 with respect to the first holding part 9, the deviations from the ideal circular path are very small. The instantaneous pivot axis therefore does not move too much away from the axis 4 about which the shaft 3 is rotatable so that interference from other external forces on the measured value remain negligibly small. The measurement is sufficiently precise in most cases.

The embodiments previously described as well as embodiments within the context of the invention which have not been described here can be universally applied, and enable an effective torque of machinery or apparatus disposed thereon to be measured in a simple way.

What is claimed is:

1. A device for measuring torque input or output through a shaft of an engine or machine, comprising a base mounting said engine or machine, holding means securing said engine or machine against movement, said holding means comprising at least one plate-shaped holding part having means connecting it to said base and having bearing means in which at least a second plate-shaped holding part is mounted, said engine or machine being detachably connected to said second holding part, said first holding part and said second holding part being disposed essentially one over the other, said second holding part and said engine or machine being pivotable in said bearing means about a pivot axis which is substantially coaxial with an axis of rotation of said shaft, a carrying part inserted between said at least one first holding part and said second holding part and being equipped with measuring elements.

2. The device according to claim 1, wherein the bearing means comprise at least one first supporting part which is fixed to the first holding part, and which projects in the area of the shaft and is provided with a passage through which the shaft is led, insertable in the passage is a bearing in which a carrier, which is fastened to the second holding part, is pivotable about the pivot axis.

3. The device according to claim 1, wherein the bearing means comprise at least one guide which is disposed in one of the two holding parts, and counterparts are provided on the other of the two holding parts, which are each led through the guide.

4. The device according to claim 3, wherein each guide is made as a slot-shaped guideway in a profile bar which is fixed on the second holding part in an end area in such a way that the guideway abuts in the end area of the first holding part, and the counterparts consist of rollers which are each rotatably fastened on the first holding part in the end area and engage in the associated guideway.

5. The device according to claim 3, wherein each guide is made as two supporting levers each of which has an end coupled to an end area of the first holding part and each of which has another end coupled to an end area of the second holding part, and in an unpivoted position of the holding parts the coupling points of each supporting lever each lie on a straight line running essentially through the axis about which the shaft is rotatable.

6. The device according to claim 1, wherein the carrying part is designed as an elastically deformable element and the measuring elements consist of resistance strain gages which are provided on the elastically deformable element.

7. The device according to claim 6, wherein the elastically deformable element is a bending beam which is detachably and interchangeably fastened by its one end to one of the two holding parts while the other end projects between two stops, which are mounted on the other of the two holding parts, and are designed adjustable.

8. The device according to claim 1, wherein the carrying part comprises a housing and the measuring elements consist of at least one piezoelectric crystal placed in the housing.

9. The device according to claim 1, wherein the measuring elements provided on the carrying part are connected by connection lines to a measuring device which converts the measuring signals imparted by the measuring elements into values corresponding to the torque and displays them.

10. The device according to claim 9, wherein a further measuring means is provided by means of which the angular velocity of the rotatable shaft is measurable, and in order to convey the measured values to the control device said measuring means is connected thereto via further connection lines.

11. A device according to claim 1 wherein said second holding part is a fixed component of said engine or machine.

12. A device according to claim 1 wherein interim elements are insertable between the engine or machine and the second holding part to adjust said pivot axis and the axis of rotation of said shaft into a coaxial position.

13. The device according to claim 1, wherein the bearing means comprise at least one supporting part projecting in the area of the shaft and having a passage through which the shaft extends, a bearing mounted in said passage, a carrier fixed to said second holding part, said carrier being pivotable about said pivot axis.

14. The device according to claim 13, wherein further guide means are provided between the first holding part and the second holding part to absorb transverse forces, which act essentially in the longitudinal direction to the axis about which the shaft is rotatable.

15. A device for measuring torque input or output through a shaft of an engine or a machine, comprising a base mounting said engine or machine, holding means securing said engine or machine against movement, said holding means comprising at least one first holding part having means connecting it to said base and having bearing means in which at least a second holding part is mounted, said engine or machine being disposed on said second holding part, said second holding part and said engine or machine being pivotable in said bearing means about a pivot axis which is substantially coaxial with an axis rotation of said shaft, interim elements insertable between the engine or machine and the second holding part to adjust said pivot axis and the axis of rotation of said shaft into a coaxial position.

16. A device for measuring torque input or output through a shaft of an engine, comprising a base mounting said engine or machine, holding means securing said engine or machine against movement, said holding means comprising at least one holding part having means connecting it to the base and having bearing means in which at least a second holding part is mounted, said bearing means comprising at least one supporting part projecting in the area of the shaft and having a passage through which the path extends, a bearing mounted in said passage, a carrier fixed to said second holding part, said carrier being pivotable about a pivot axis which is substantially coaxial with an axis of rotation of said shaft, a carrying part inserted between said at least one first holding part and said second holding part and being equipped with measuring elements.

17. A device for measuring torque input through a shaft of an engine or machine, comprising a base mounting said engine or machine, holding means securing said engine or machine against movement, said holding means comprising at least one holding part having means connecting it to said base and having bearing means in which at least a second holding part is mounted, said bearing means comprising at least one guide which is disposed in one of the two holding parts, counterparts provided on the other of the two holding parts, which are led through the guide, said second holding part and said engine or machine being pivotable in said bearing means about a pivot axis which is substantially coaxial with an axis of rotation of said shaft, a carrying part inserted between said at least one first holding part and said second holding part and being equipped with measuring elements.

18. The device according to claim 17, wherein each guide is a slot-shaped guideway in a profile bar fixed on the second holding part in an end area in such a way that the guideway abuts in an end area of the first holding part, said counterparts comprising rollers each of which are rotatably fastened on the first holding part in the end area and engage in the associated guideway.

19. The device according to claim 17 wherein each guide is made as two supporting levers each of which has an end coupled to an end area of the first holding part and each of which has another end coupled to an end area of the second holding part, and in an unpivoted position of the holding parts the coupling points of each supporting lever each lie on a straight line running essentially through the axis about which the shaft is rotatable.

* * * * *